(12) United States Patent
Kihara et al.

(10) Patent No.: US 9,379,763 B2
(45) Date of Patent: Jun. 28, 2016

(54) WIRELESS DEVICE AND WIRELESS NETWORK SYSTEM

(75) Inventors: Hajime Kihara, Tokyo (JP); Norihisa Yanagihara, Tokyo (JP); Takashi Iwaki, Tokyo (JP); Takayoshi Fujioka, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 116 days.

(21) Appl. No.: 13/983,013

(22) PCT Filed: Dec. 8, 2011

(86) PCT No.: PCT/JP2011/078494
§ 371 (c)(1),
(2), (4) Date: Oct. 11, 2013

(87) PCT Pub. No.: WO2012/147232
PCT Pub. Date: Nov. 1, 2012

(65) Prior Publication Data
US 2014/0036721 A1  Feb. 6, 2014

(30) Foreign Application Priority Data
Apr. 27, 2011  (JP) ................................. 2011-099819

(51) Int. Cl.
*H04B 1/40* (2015.01)
*H04B 1/403* (2015.01)
(Continued)

(52) U.S. Cl.
CPC ............... *H04B 1/406* (2013.01); *G08C 17/00* (2013.01); *H04W 84/18* (2013.01); *H04W 88/06* (2013.01)

(58) Field of Classification Search
CPC ...................................................... H04B 1/406
See application file for complete search history.

(56) References Cited

U.S. PATENT DOCUMENTS 6,108,562 A * 8/2000 Rydbeck et al. ............ 455/552.1
2002/0068608 A1 * 6/2002 Souissi ......................... 455/557
(Continued)

FOREIGN PATENT DOCUMENTS

EP  2 224 769 A1  9/2010
JP  2003-533061 A  11/2003
(Continued)

OTHER PUBLICATIONS

Singaporean Written Opinion dated Oct. 18, 2013 (Seven (7) pages).
International Search Report dated Jan. 17, 2012 w/ partial English translation (three (3) pages).
(Continued)

*Primary Examiner* — Jason Mattis
(74) *Attorney, Agent, or Firm* — Crowell & Moring LLP

(57) ABSTRACT

Provided is a wireless device and a wireless network capable of readily communicating wirelessly using different frequency bands and wireless formats to match the state of wireless communication at the installation location of the facility being monitored. A wireless device for performing wireless communication using a wireless module suited to the state of communication, the wireless device being provided with a plurality of wireless modules on a base substrate, wherein the wireless modules are a plurality of wireless modules between which the frequency and/or the wireless format differ. The wireless device is characterized in being provided with: a device controller for selecting a wireless module suited to the state of communication, the device controller being detachably mounted on the base substrate and connected to the plurality of wireless modules by signal wires; and a terminal block for external connection and a communication interface, which are connected to the device controller. The wireless device performs wireless data communication using a wireless module selected by the device controller, the data being acquired from the terminal block or the communication interface.

12 Claims, 11 Drawing Sheets

(51) Int. Cl.
  *H04W 84/18*  (2009.01)
  *G08C 17/00*  (2006.01)
  *H04W 88/06*  (2009.01)

(56) References Cited

U.S. PATENT DOCUMENTS

| | | |
|---|---|---|
| 2006/0172784 A1 | 8/2006 | Ara et al. |
| 2006/0282518 A1 | 12/2006 | Karaoguz et al. |
| 2008/0043714 A1* | 2/2008 | Pernu .............................. 370/350 |
| 2010/0080172 A1* | 4/2010 | Jin et al. ........................ 370/328 |

FOREIGN PATENT DOCUMENTS

| | | |
|---|---|---|
| JP | 2005-20566 A | 1/2005 |
| JP | 2006-227695 A | 8/2006 |
| JP | 2009-171030 A | 7/2009 |
| WO | WO 99/09771 A1 | 2/1999 |
| WO | WO 03/098851 A1 | 11/2003 |
| WO | WO 2008/020278 A2 | 2/2008 |
| WO | WO 2009/141490 A1 | 11/2009 |

OTHER PUBLICATIONS

European Search Report dated Mar. 23, 2015 (11 pages).

* cited by examiner

FIG. 8

SELECTION OF WIRELESS MODULE

| WIRELESS COMMUNICATION SPEED \ FREQUENCY | LOW | MEDIUM | HIGH |
|---|---|---|---|
| LOW | LONG DISTANCE COMMUNICATION IN COMPLEX ENVIRONMENT | SUBSTANTIALLY LONG DISTANCE COMMUNICATION IN COMPLEX ENVIRONMENT | SHORT DISTANCE SMALL DATA COMMUNICATION |
| MEDIUM | LONG DISTANCE COMMUNICATION AT SUBSTANTIALLY HIGH SPEED | SUBSTANTIALLY LONG DISTANCE COMMUNICATION AT SUBSTANTIALLY HIGH SPEED | SHORT DISTANCE COMMUNICATION AT SUBSTANTIALLY HIGH SPEED |
| HIGH | HIGH SPEED LONG DISTANCE COMMUNICATION AS FAR AS POSSIBLE | SUBSTANTIALLY LONG DISTANCE COMMUNICATION AT HIGH SPEED | HIGH SPEED SHORT DISTANCE COMMUNICATION AS CLOSE AS POSSIBLE |

FIG. 9

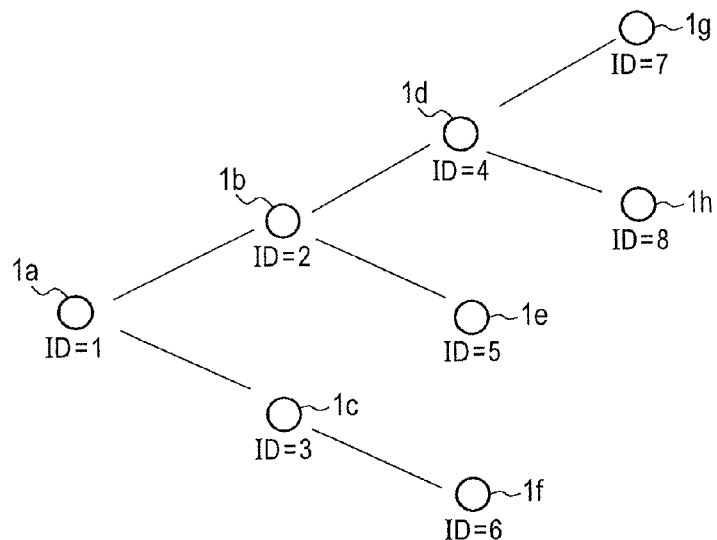

FIG. 14

| SOURCE ID | DESTINATION ID | GROUP ID | TRANSMISSION DATA |
|---|---|---|---|

| TYPE | DESCRIPTION |
|---|---|
| SOURCE ID | SOURCE ID OF WIRELESS DEVICE |
| DESTINATION ID | DESTINATION ID OF WIRELESS DEVICE |
| GROUP ID | GROUP ID OF WIRELESS DEVICE GROUP |
| TRANSMISSION DATA | PACKET DATA FOR TRANSMISSION |

FIG. 16

FEATURES OF WIRELESS COMMUNICATION AT FREQUENCIES

| WIRELESS FREQUENCY | LOW | MEDIUM | HIGH |
|---|---|---|---|
| COMMUNICATION DISTANCE | LONG | MEDIUM | SHORT |
| COMMUNICATION SPEED | LOW | MEDIUM | HIGH |

SET HIGH FREQUENCY WIRELESS MODULE AT HIGH COMMUNICATION SPEED
↓
COMMUNICATION TO HIGHER WIRELESS DEVICE OF NETWORK
↓
CHANGE TO WIRELESS MODULE AT LOWER FREQUENCY IN RESPONSE TO CONNECTION DISABLED STATE

WIRELESS DEVICE AND WIRELESS NETWORK SYSTEM

TECHNICAL FIELD

The present invention relates to a wireless device and a wireless network system for wireless data communication using various types of frequency and wireless format.

BACKGROUND ART

As one of usages of a wireless device in the relevant technical field, monitoring and operation of various facilities have been carried out wirelessly. Various facilities are monitored in reference to sensor information such as electric energy and temperature, and data information such as abnormality notification. The aforementioned information from those facilities is mostly obtained through cable data communication. However, it is likely that the facility to be monitored and the monitoring place are remotely located, requiring the wiring work therebetween. Wireless communication may facilitate monitoring and operation of the facility far away from the monitoring place without requiring the wiring work.

There may be various facility set-up environments dependent on site as well as amount of communication information required for monitoring the subject facility. For this, it is necessary to select both the frequency band and wireless format optimal for the wireless communication in accordance with the set-up place of the facility and the communication condition. Considering features of the wireless frequency, it is likely that the high frequency leads to high communication speed and short communication distance, and low frequency leads to low communication speed and long communication distance. The same frequency may have different features dependent on the communication mode (LAN, Bluetooth (registered trademark)), and standard. This may cause difficulty in the work to construct the optimal wireless network by selection from those described above adapted to an EM environment and a facility set-up environment.

If the facility is generally monitored and operated wirelessly, it is necessary to determine the wireless format to be employed, carry out the onsite radio wave investigation on the frequency in accordance with the wireless format, and then construct the network. If different wireless formats are employed together in the network, the wireless devices at wireless frequencies for use have to be separately prepared. Combining those devices makes the network complex, resulting in the tendency that deteriorates ease of introduction and operability after such introduction.

Patent literature 1 discloses the structure that efficiently carries out wireless communication between respective mobile terminals and the base station using a plurality of communication channels. The wireless LAN access point is provided with a plurality of wireless LAN modules for the purpose of allowing simultaneous use of some of a plurality of communication channels at different frequencies. The respective wireless LAN modules have different communication channels. The wireless LAN access point detects the number of connected mobile terminals corresponding to the respective communication channels so as to transmit the communication channel information indicating the number of connected mobile terminals of the respective communication channels to the mobile terminal. This allows the terminal to select the communication channel connected to a smaller number of the terminals, and ensures efficient wireless communication between the respective mobile terminals and the base station.

CITATION LIST

Patent Literature

Patent Literature 1: Japanese Unexamined Patent Application Publication No. 2005-20566

SUMMARY OF INVENTION

Technical Problem

Patent literature 1 discloses the mode that provides a plurality of the same wireless LAN modules to use resource of the frequency effectively by changing the channel in the frequency band of the wireless LAN communication mode.

The use of the channel in the frequency band as described above is limited, and the band of the single wireless communication mode (LAN) only for changing the channel is narrow. It is therefore difficult to carry out the communication upon interference in such frequency band. If the wireless module for the mode other than those for the wireless LAN communication mode, it is necessary to have the communication modes for operating such module and information set for each of the communication modes, resulting in complicated structure.

The wireless communication has features dependent on the frequency band. As the frequency is decreased, the diffraction capability of radio wave is improved, and reachability is increased. However, the communication speed is likely to be lowered. The wireless environment varies dependent on the facility set-up. It is therefore required to construct the wireless network using suitable frequency for stable communication. It may take much time to construct the appropriate wireless network by conducting the field survey and investigation in operation, while repeating try and error. Even after introduction of the aforementioned network, interference to the communication may occur in response to change in the peripheral wireless environment. If the network is constructed by combining a plurality of wireless devices, it will cause much trouble in setting of the modules, and further increase the cost owing to increased man-hours for operation and maintenance of the constructed network.

In view of the aforementioned problems, it is an object of the present invention to provide the wireless device and the wireless network which ensure easy wireless communication using a plurality of frequency bands and wireless formats adapted to the wireless communication status of the site where facilities to be monitored are set up.

Means for Solving the Problem

In order to achieve the object, the present invention provides a wireless device including a plurality of wireless modules on a base substrate, which carries out a wireless communication using the wireless module adapted to a communication status. The plurality of wireless modules are detachably mounted on the base substrate, and at least one of frequencies and communication modes of which have different values. The wireless device includes a device controller connected to the plurality of wireless modules via a signal line for selecting the wireless module adapted to the communication status, and a terminal block and a communication interface which are connected to the device controller for external connection. The wireless module selected by the device controller is used for carrying out the wireless communication of data obtained from the terminal block or the communication interface.

In the wireless device, the device controller selects the wireless module adapted to the communication status, and further includes a control unit for controlling an operation of the selected wireless module In the wireless device, the wireless module includes a wireless modem adapted to the frequency and the wireless mode, and a module control unit, and the module control unit is configured to communicate with the device controller using a common communication command via the signal line.

In the wireless device, the device controller includes a memory for setting network information of a wireless network system including a plurality of the wireless devices.

In the wireless device, the device controller sets the network information including an ID number for identifying the wireless device, an ID number of the wireless device as a counterpart of transmission and reception, and selection information of the wireless module to be used in the memory, and carries out the wireless communication with the wireless device as a destination of the transmission and reception using the selected wireless module.

In order to achieve the object, the present invention provides a wireless network system having a plurality of wireless modules on a base substrate, which is configured to have a plurality of wireless devices for carrying out a wireless communication using the wireless module adapted to a communication status. The plurality of wireless modules in the wireless device are detachably mounted on the base substrate, having frequencies and/or communication modes, at least one of which have different values. The wireless device includes a device controller connected to the plurality of wireless modules via a signal line for selecting and operating the wireless module adapted to the communication status, and a terminal block and a communication interface which are connected to the device controller for external connection. The wireless module selected by the device controller is used for carrying out the wireless communication of data obtained from the terminal block or the communication interface between the wireless devices.

In the wireless network system, the device controller of the wireless device includes a control unit for selecting the wireless module adapted to the communication status and controlling an operation of the selected wireless module.

In the wireless network system, the wireless module of the wireless device includes a wireless modem adapted to the frequency and a wireless format, and a module control unit. The module control unit is configured to communicate with the device controller using a common communication command via the signal line.

In the wireless network system, the device controller of the wireless device includes a memory for setting network information.

In the wireless network system, the device controller of the wireless device sets the network information including an ID number for identifying the wireless device, an ID number of the wireless device as a counterpart of transmission and reception, and selection information of the wireless module to be used in the memory, and carries out the wireless communication with the wireless device as a destination of the transmission and reception using the selected wireless module.

Advantageous Effects of Invention

According to the present invention, the wireless device is set to ensure easy wireless communication using the frequency and communication mode optimal for the site, which are selected from a plurality of different frequencies and wireless communication modes. It is possible to easily construct the optimal wireless network systems for various sites, thus improving communication reliability and simplifying operation and maintenance of the constructed network.

BRIEF DESCRIPTION OF DRAWINGS

FIG. 8 is an explanatory view showing an example of criterion for selecting the wireless module in the wireless device.

FIG. 9 is a view showing a configuration of a wireless network according to a fifth example of the present invention.

FIG. 14 is an explanatory view showing a transmission data packet.

FIG. 16 is an explanatory view showing selection and change of the wireless module in the wireless device.

DESCRIPTION OF EMBODIMENT

Figure 1:
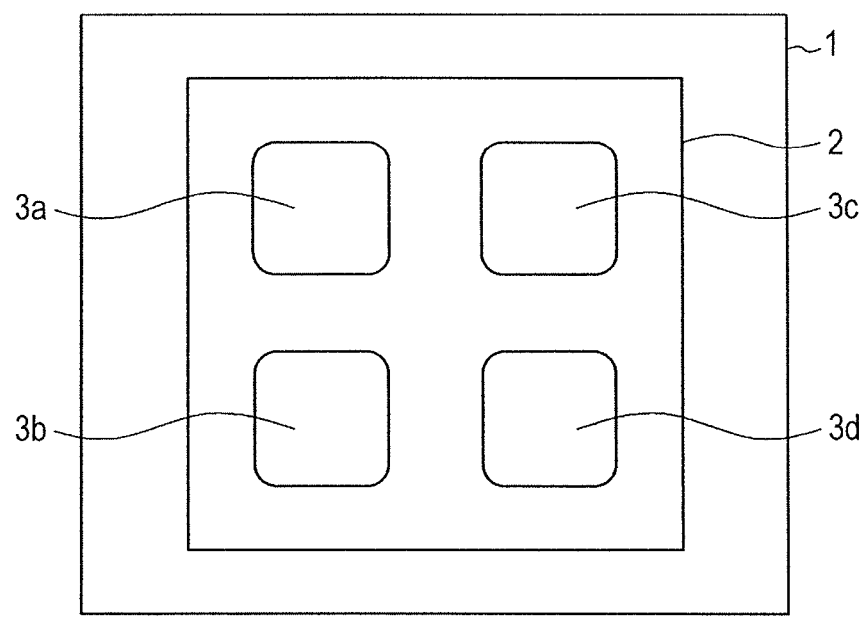
FIG. 1 is an explanatory view showing a structure of a wireless device according to a first example of the present invention.

An embodiment for carrying out the present invention will be described in detail referring to the drawings.

FIG. 1 is an explanatory view of a structure showing how a wireless device according to a first example of the present invention works. The wireless device 1 includes a base substrate 2 in a casing, and wireless modules 3 (3a to 3d) are mounted on the substrate 2. The wireless modules 3 have different frequencies and/or communication modes, and are detachably mounted on the base substrate 2.

The frequency refers to the wireless frequency, for example, 2.4 GHz, 950 MHz and 429 MHz. The frequency communication mode refers to the wireless communication mode for a wireless LAN, Bluetooth and ZigBee (registered trademark).

Figure 2:
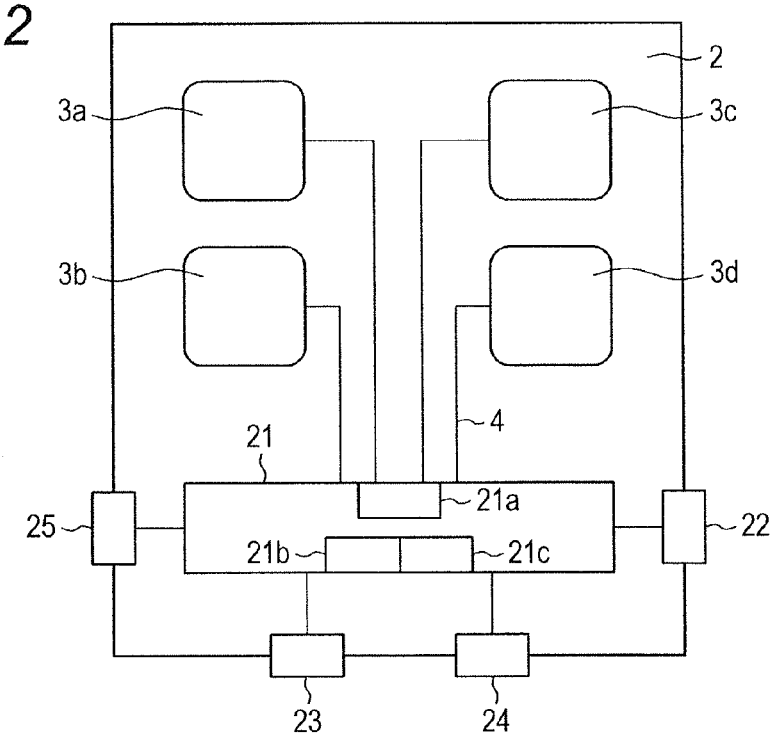
FIG. 2 is an explanatory view showing a structure of a base substrate in the wireless device according to the first example.

FIG. 2 is an explanatory view showing a structure of the base substrate 2 provided in the wireless device 1 shown in FIG. 1. The base substrate 2 has a device controller 21 which communicates with the wireless modules 3 mounted on the substrate via signal lines 4. The device controller 21 is configured as a control system which includes a CPU (Central Processing Unit), and has a function of temporarily buffering data and transferring such data. The device controller 21 includes an interface 21a that communicates with the respective wireless modules 3, a control unit 21b that selects the wireless module adapted to the communication based on information setting and set information, and a memory 21c that sets the set information for the wireless device 1 and network information (described later) upon construction of the wireless network. The base substrate 2 includes an interface for connecting the device controller 21 and outside of the wireless device. Specifically, the substrate includes a USB connector 22 for connection to the outer device (personal computer), a serial connector 23, an Ethernet (registered trademark) connector 24, and a terminal block 25 for connection to a measurement sensor of the device to be monitored.

The network information is required for determining the frequency and wireless format employed for the wireless communication, and setting the operating function of the wireless module. The network information is obtained by preliminarily generating the optimal information by simulation using the personal computer, and setting such optimal information in the wireless device via the communication interfaces (22 to 24) such as the USB connector 22.

The set information includes numbers of the respective wireless devices (arbitrary ID number for identifying the wireless device), the information of other wireless device that constitutes the network (ID number of the wireless device as the counterpart of the transmission and reception), and a group ID (described later). Each function of the respective wireless devices may be determined by allowing all the wireless devices that constitute the wireless network to share the network information. Each of the wireless devices is configured to have the ID numbers of the respective wireless devices, and the information of the wireless devices having such numbers in the wireless network so as to clarify the status of the adjacent wireless devices with each other. It is possible to confirm the status of the adjacent wireless device, for example, the status where the communication has been interrupted for a predetermined period of time. This makes it possible to easily identify the device having its operation interrupted.

Figure 3:
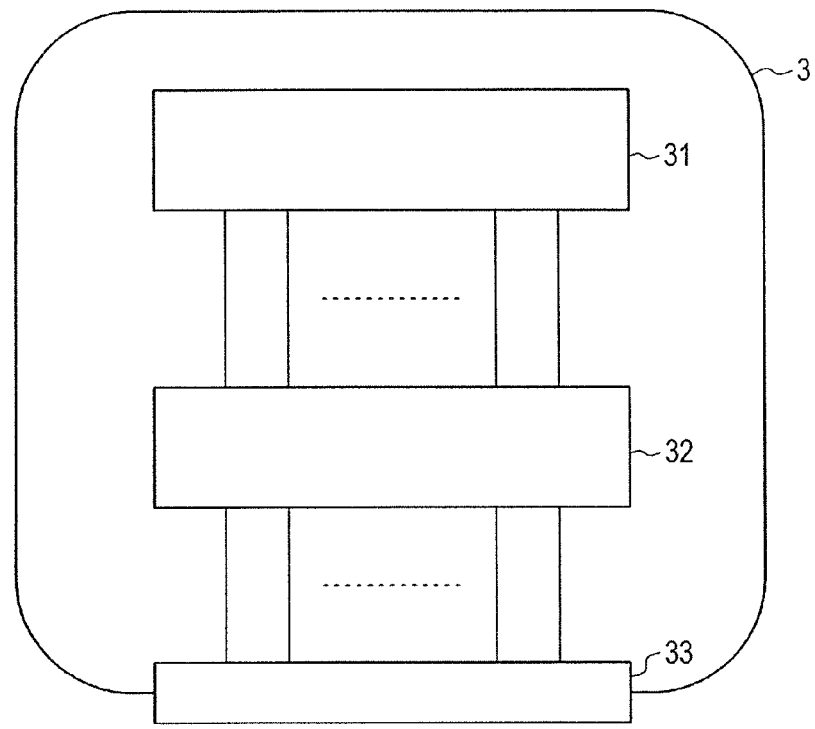
FIG. 3 is an explanatory view showing a structure of a wireless module in the wireless device according to the first example.

FIG. 3 is an explanatory view showing a structure of the wireless module. The wireless module 3 contains a wireless modem 31 for the wireless communication, and a module control unit 32 serving to communicate with the device controller 21, and is detachably mounted on the base substrate 2 via a connector 33. There are large number of the wireless modules 3 provided with the wireless modems 31 of different type that ensure transmission and reception at various frequencies and communication modes. They are detachably mounted on the base substrate 2 in accordance with the wireless communication status of the site where the facilities are set up.

The wireless modules 3 are connected to the device controller 21 via the signal lines 4 when they are mounted on the base substrate 2. The wireless module is configured to communicate with the interface function of the module control unit 32 through conversion of the interface 21a of the device controller 21 using the common communication command (common protocol). Accordingly, the communication may be established using the common protocol irrespective of the type of the wireless module mounted on the base substrate 2 (type of wireless frequency and type of wireless communication mode). Even if the different wireless module is mounted on the base substrate, the wireless communication may be established without considering the wireless format. This makes it possible to cover various kinds of wiring formats by mounting the wireless module adapted to the application.

In the above-described structure, upon wireless transmission of a measurement signal from the measurement sensor of the device to be monitored to the outside, the measurement signal obtained from the sensor via the terminal block 25 is loaded to the device controller 21, and the signal is transmitted to the wireless module selected by the device controller 21 using the common communication command so as to carry out the wireless transmission to the outside in accordance with the communication mode corresponding to the selected wireless module. Meanwhile, the data received by the wireless module 3 from outside are transmitted from the module control unit 32 to the device controller 21 using the common communication command. The data are output to the external device (personal computer) via the USB connector 22, the serial connector 23, the Ethernet (registered trademark) connector 24 as appropriate.

Figure 4:
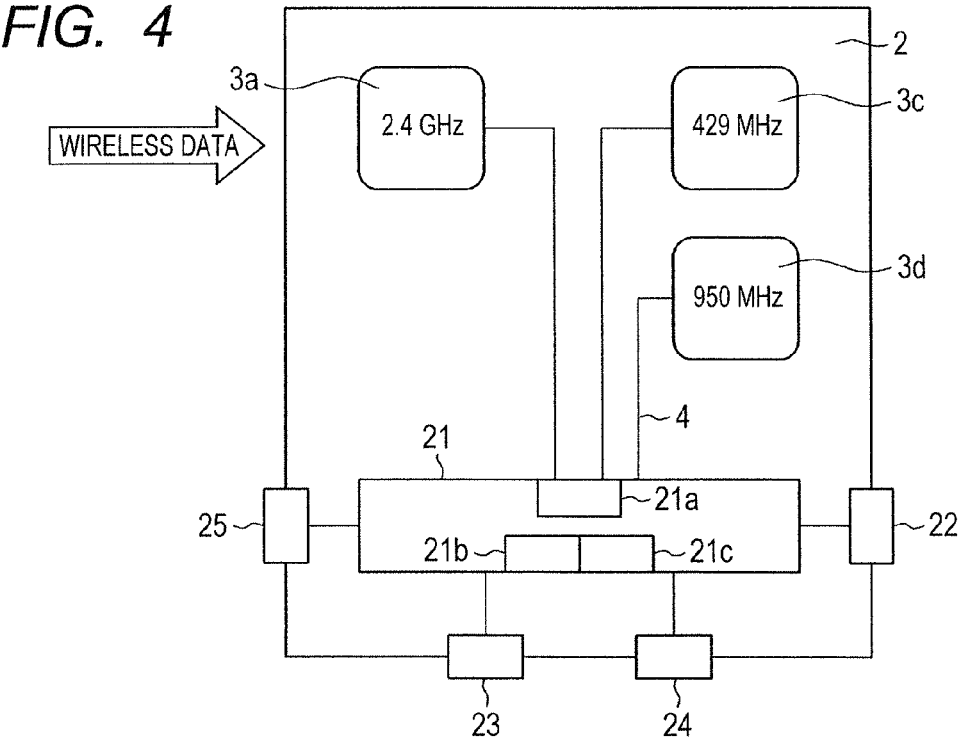
FIG. 4 is an explanatory view showing functions of the wireless modules at different frequencies in the wireless device according to a second example of the present invention.

FIG. 4 is an explanatory view of the function resulting from a plurality of wireless modules at different frequencies in the wireless device according to a second example of the present invention. The wireless modules 3a, 3c and 3d at different to frequencies are mounted on the base substrate 2. The modules contain modems 31 at different frequencies of 2.4 GHz, 950 MHz and 429 MHz, respectively. The module number and the frequency of the mounted wireless module are set in the memory 21c by the control unit 21b of the device controller 21.

The device controller 21 tries to carry out the communication by allowing the control unit 21b to select the wireless module at high wireless communication speed (high frequency), basically, for carrying out the high speed communication in accordance with the content stored in the memory 21c. First of all, the controller selects the wireless module 3a at the highest wireless communication speed and frequency of 2.4 GHz, and tries to carry out the wireless communication. If the normal communication cannot be established as a result of the communication, the controller then selects the wireless module 3c at high wireless communication speed and frequency of 950 MHz, and carries out the communication. The normal communication is successful so long as the frequency areas of all the mounted wireless modules are not suffered from the interference. In this way, the device controller 21 makes an attempt to select the wireless module at appropriate frequency for the communication at speed as high as possible.

The wireless module at low frequency allows long distance communication. When a communication error occurs resulting from change in the environment where the facility to be measured is set up in the middle of the operation, the module at lower frequency is selected from the mounted wireless modules so as to continue the communication. The device controller 21 makes an attempt to select the wireless module that ensures stable communication at the speed as high as possible. This may construct the network easily between the wireless device and the facility to be measured upon set-up and operation.

If temporary communication interference occurs or communication quality is deteriorated during the operation, the device controller selects the wireless module in the lower frequency band so as to maintain the communication quality.

Figure 5:
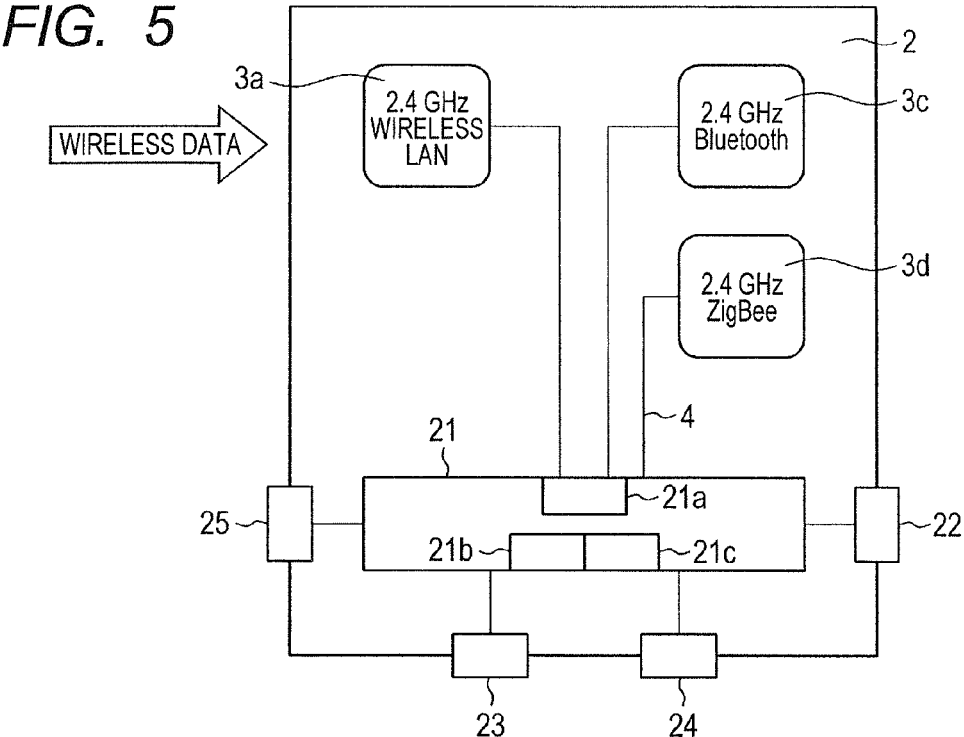
FIG. 5 is an explanatory view showing functions of the wireless modules with different communication modes of the wireless device according to a third example of the present invention.

FIG. 5 is an explanatory view showing functions of the wireless modules with different communication modes in the wireless device according to a third example of the present invention. The wireless modules 3a, 3c, 3d at the same frequency of 2.4 GHz with different wireless communication modes are mounted on the base substrate 2. Each of the modules includes the modem 31 for the wireless LAN, Bluetooth, ZigBee (registered trademark). The module number, frequency and communication mode of the mounted wireless module are set in the memory 21c by the control unit 21b of the device controller 21.

The device controller 21 carries out the communication by combining those wireless modules to ensure the wireless communication adapted to the environment where the facilities to be measured are set up. The device controller 21 tries to establish the communication by primarily selecting the communication mode at the speed as high as possible based on the distance between the facility to be measured and the wireless device. In the case where the facility (device) as the desired counterpart of the communication uses the different wireless format such as the wireless LAN and Bluetooth, the subject wireless device has the wireless module with adapted wireless format, thus allowing the device controller 21 to select the module for the wireless communication without changing the wireless device. Even if different wireless formats are mixed, the network between the wireless device and the facility to be measured may be easily constructed.

Figure 6:
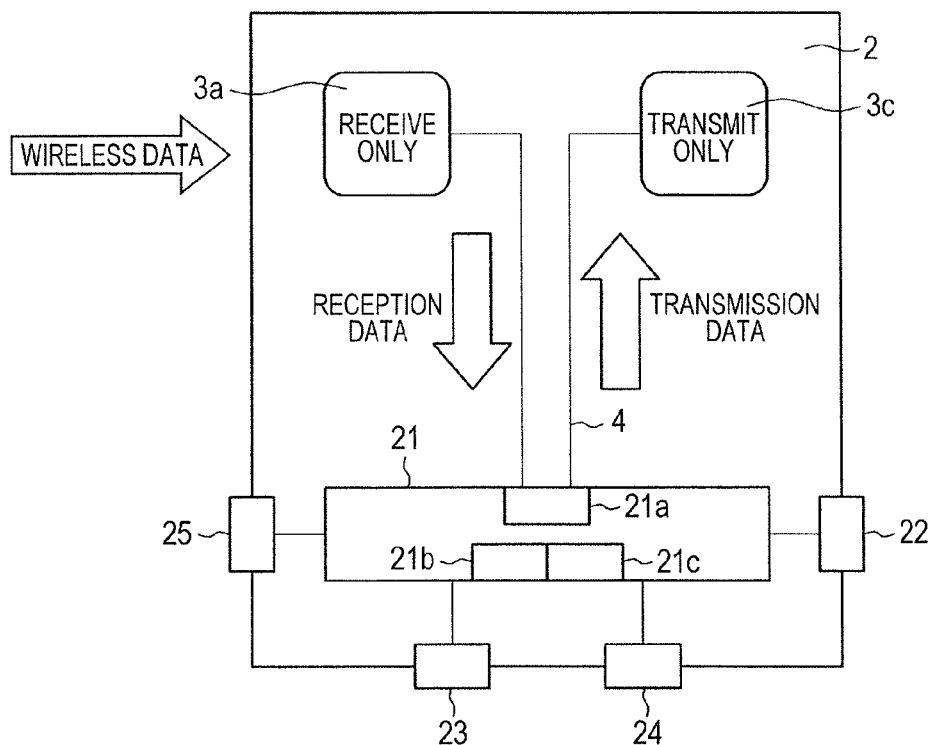
FIG. 6 is an explanatory view showing a communication behavior of the wireless module selected and set for operation in the wireless device according to a fourth example of the present invention.

FIG. 6 is an explanatory view showing a communication behavior of the wireless module selected and set for operation in the wireless device according to a fourth example of the present invention. In this example, use of the wireless device as a gateway will be described as an example. The wireless module (module number, frequency and communication mode) mounted on the base substrate 2 is set in the memory 21c of the device controller 21. The device controller 21 sets the selected wireless module 3a as the only one for receiving data, and further sets the selected wireless module 3c as the only one for transmitting the received data. The wireless module 3a serves to only receive the wireless data, and then transmits the received is data to the device controller 21 of the base substrate 2 once. The received data are sent to the other wireless module 3c from the device controller 21 via the signal line 4, and carries out the wireless transmission using the other wireless module. Both the wireless modules 3a and 3c are separately provided so as to ensure transmission and reception at different frequencies without interference with each other. This makes it possible to carry out the stable wireless communication, and improve efficiency of the data communication.

Figure 7:
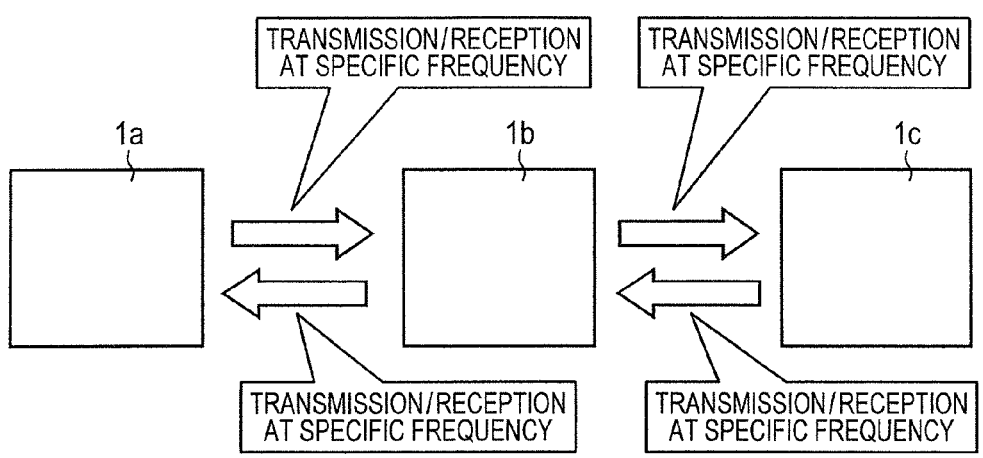
FIG. 7 is an explanatory view showing a communication behavior among a plurality of wireless devices according to the fourth example.

FIG. 7 is an explanatory view showing a communication behavior of the system constructed as the network of the wireless devices shown in FIG. 6. The system includes three wireless devices (1a, 1b, 1c), and the wireless device 1b serves as the gateway. Frequencies and communication modes of the wireless modules for transmission and reception between the wireless devices are adjusted so as to allow stable wireless communication in the specific frequency band exclusively without interference. The aforementioned combination allows the wireless communication at different frequencies, and construction of the wireless network adapted to the application applied between the wireless devices.

FIG. 8 is an explanatory view showing an example of criterion for selecting the wireless module. It is possible to assume the wireless module to be prepared in accordance with the site environment of the facility to be measured required for the wireless communication. For example, if the remotely located facility in the complicated environment is required for the communication, the wireless module at low frequency and low wireless communication speed may be selected. In this way, the facility to be measured and the environment for the wireless communication are identified to allow selection of the wireless module.

FIG. 9 is a view showing a configuration of the wireless network according to a fifth example of the present invention. The network has a system which includes the highest wireless device 1a and a large amount of lower wireless devices 1b to 1h, which are wirelessly connected to form a tree shape. As an example of the wireless network configuration, the network information is stored in the device controllers of all the wireless devices that constitute the system. The network information includes an arbitrary number (ID) that identifies the wireless device for constituting the network, and the number (ID) that identifies the wireless device as the counterpart of transmission and reception between the respective wireless devices. The operation in the network may be determined by setting the function of the subject wireless device and the number (ID) in the device controller.

The arbitrary numbers (IDs) for identifying the respective wireless devices refer to those numbers (IDs) independent from the communication mode rather than the address dependent on such communication mode as the MAC address (Media Access Control address) employed for the LAN communication. Accordingly, the common number (ID) may be used irrespective of the different communication mode for the wireless communication between the wireless devices. This makes it possible to easily construct the wireless network system, and further change the network system easily.

Referring to FIG. 9, the wireless device 1a is set at the highest position in the network, serving to collect data of the overall system. The wireless devices 1b to 1d are set at intermediate positions in the network, each serving as a gateway that receives monitoring data derived from the facility to be measured and transfers such data to the higher wireless device. The wireless devices 1e to 1h are set for sending the monitoring data measured by the sensor of the facility to be measured to the higher wireless devices.

Figure 10:
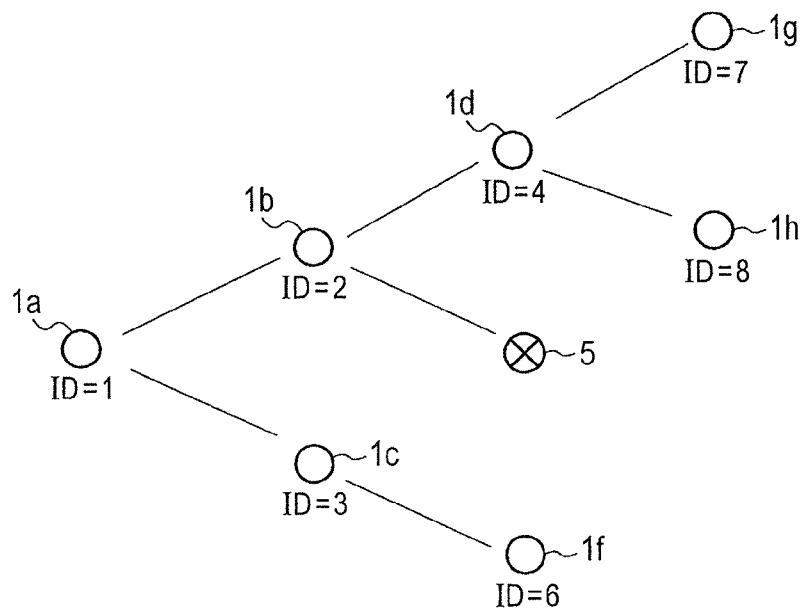
FIG. 10 is a view showing a configuration of the wireless network according to a sixth example of the present invention.

FIG. 10 is a view showing a configuration of the wireless network according to a sixth example of the present invention, representing the method of removing the separated network error upon failure of the wireless device. Communication from the faulty wireless device in the network system is interrupted for a predetermined or longer period of time. This allows the higher wireless device of the tree type configuration to judge that the lower wireless device is faulty. Assuming that the wireless device 5 shown in FIG. 10 is brought into the faulty state, the wireless device 1b (normally operated) at the position higher than the wireless device 5, constituting the tree type configuration is allowed to identify the faulty wireless device.

Restoration for the failure may be made by replacing the faulty wireless device with the normal one, and setting the number ID=5 in the device controller of the newly replaced wireless device. The replaced wireless device transmits the measurement monitoring data of the facility to be measured, to which the ID "5" has been added to the higher wireless device 1b. This allows the wireless device 1b to receive the normal measurement monitoring data and the source ID number. In this example, the wireless device may be identified by simply adding the ID number without using the identification number unique to the device. So it is possible to make the restoration only by replacing the wireless device with the one having the reset ID number. In this way, maintenance and operability of the wireless network may be improved by simplifying identification of the faulty point and resetting.

Figure 11:
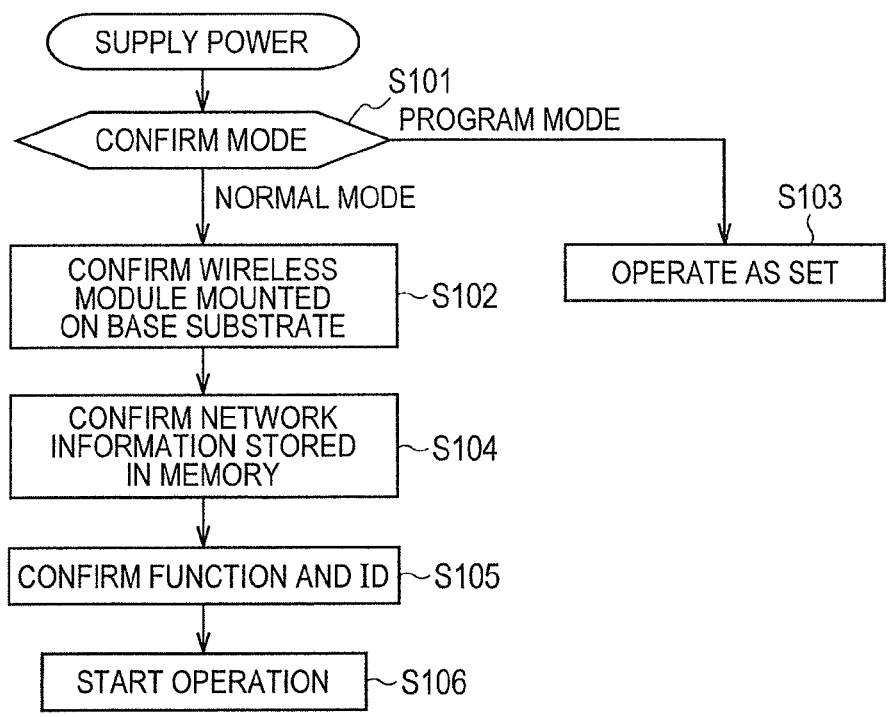
FIG. 11 is an explanatory view showing an operation flow of the wireless device according to the first example of the present invention.

FIG. 11 is an explanatory view showing an operation flow of the process executed by the wireless device 1 in the wireless network system. Subsequent to power supply, the device controller 21 of the wireless device judges with respect to the status of the mode (normal mode/program mode) of the device in S (sequence) 101.

When it is judged that the device is in the normal mode indicating the normal operation, in S102, information of the wireless module is obtained for the purpose of confirming the wireless module mounted on the base substrate. As the wireless module is provided with the common interface command, the device controller 21 sends query to the respective modules so as to obtain the module information. Then in S104, the network configuration is identified by obtaining (checking) the set network information stored in the memory of the device controller 21. In S105, the set number (ID) of the subject device, and its function in the network are confirmed. In S106, the operation is started in accordance with the operation content.

If the set mode is judged as the program mode, the control unit 21b contained in the device controller 21 sets the ID number for identifying the wireless device in S103. This setting operation may be easily set and changed by a DIP switch of the control unit 21b, for example.

Figure 12:
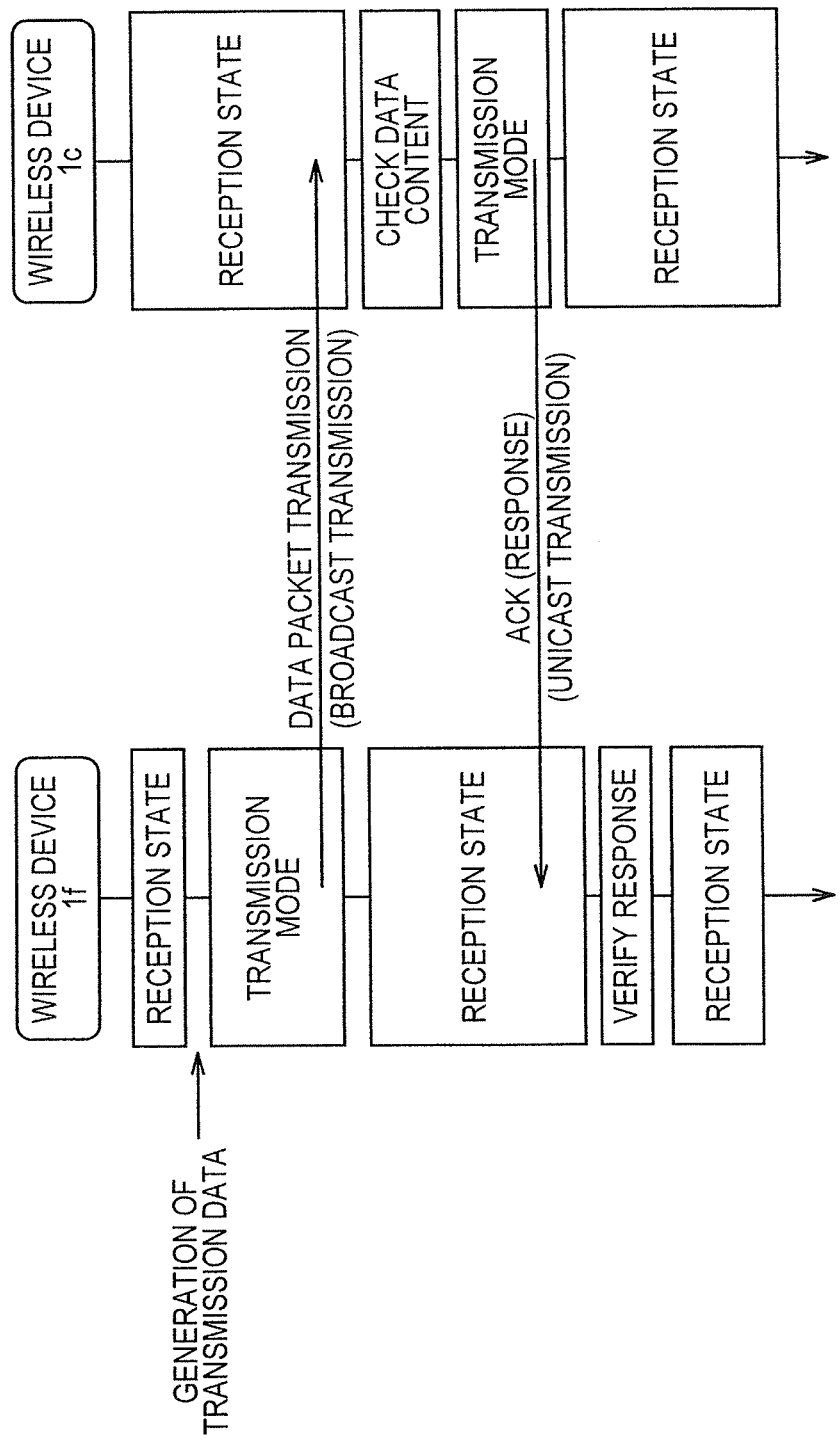
FIG. 12 is an explanatory view showing a sequence of the wireless communication.

FIG. 12 is an explanatory view of a sequence for the wireless communication. This sequence will be described by taking the wireless communication between the wireless devices 1f and 1c as the example. The wireless devices 1 are brought into a reception state after distributing power to the power supply. If the measurement data are generated from the facility to be measured of the wireless device 1f, the wireless device 1f receives such data from the facility wirelessly. Thereafter, the mode of the wireless device 1f is changed to the transmission mode for creating the packet for data transmission so as to transmit the measurement data wirelessly. As the wireless transmission of this case has no information about location of the wireless device as the counterpart, the broadcast transmission (transmission without designating the address) is carried out.

The wireless device 1c that has received the data checks the data content, and further checks with respect to the ID of the network information so that it is confirmed if the data are acceptable. Specifically, the ID number of the wireless device 1f as the source and the ID number of the network information stored in the memory are compared so as to judge if the data are acceptable. If the data from the lower wireless device in the network are acceptable, the data part is taken. Otherwise the data will be dropped. Upon reception of the data, the wireless device is selects the transmission mode, and makes an acknowledgment ACK to the source (wireless device 1f). In this case, as the counterpart is identified, the method that ensures transmission of the data to the destination is taken by carrying out the unicast transmission (transmission by designating the single address). After confirming the response, the wireless device 1f has its status changed to the reception state.

Figure 13:
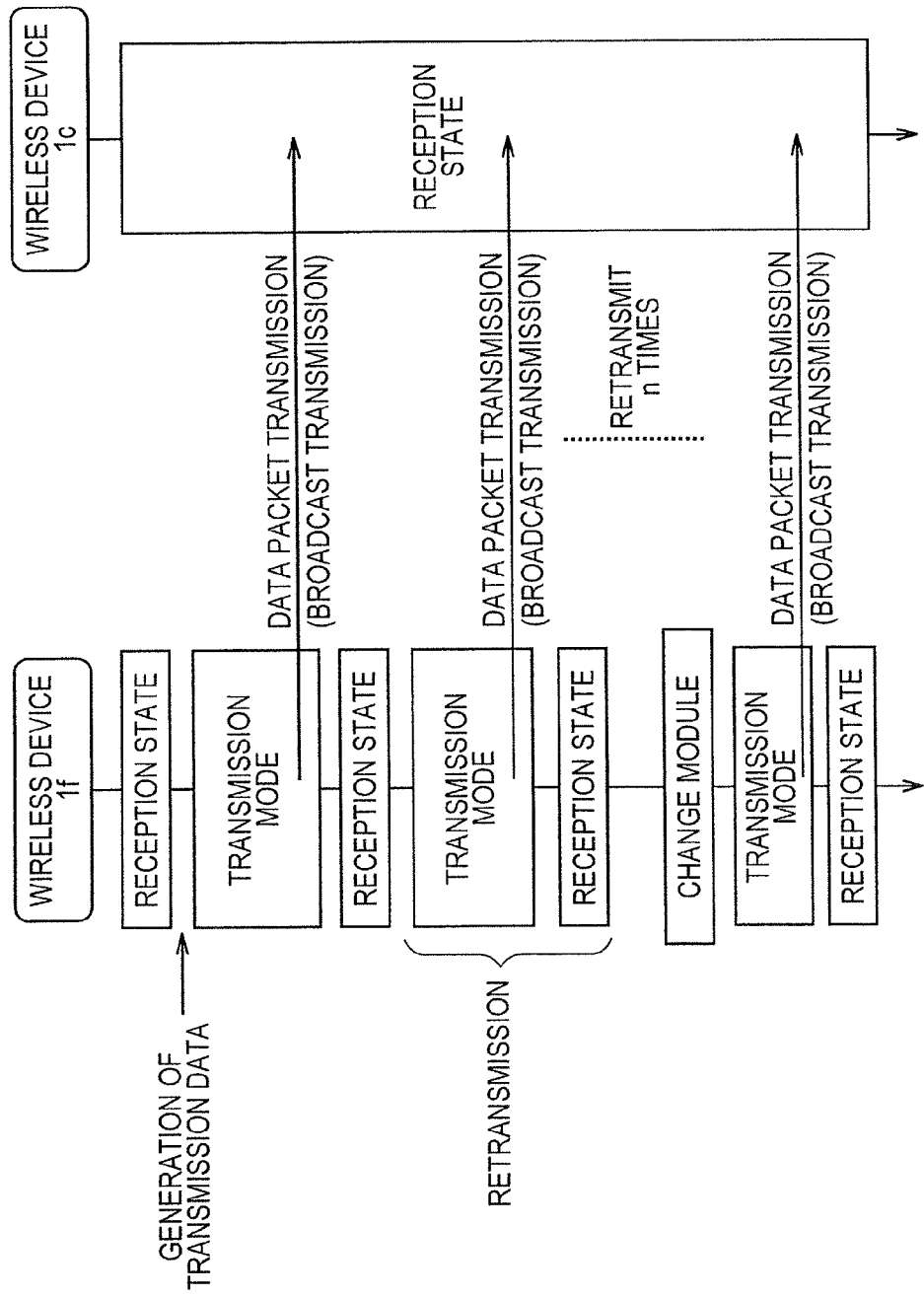
FIG. 13 is an explanatory view showing a sequence of the wireless communication in retransmission.

FIG. 13 is an explanatory view representing retransmission shown in the sequence for the wireless transmission. The transmission data are generated, and the wireless device 1f carries out the broadcast transmission. If there is no response data of ACK even if the device is brought into the reception state, the retransmission will be carried out. If the transmission fails after performing a plurality of retransmissions, another module with changed frequency and wireless format is selected so as to be subjected to the similar retransmission procedure as described above for the wireless communication.

FIG. 14 is an explanatory view of a packet of the transmission data. The source ID number, the destination ID number, and a group ID number are added to the transmission data so as to create the packet data. The group ID number is set as the one for a group of the wireless devices so that the wireless devices are divided into a plurality of groups in the network. The wireless device that has received the data checks the group ID number, and further checks the source ID number and the destination ID number. In other words, each of the ID numbers is checked against the stored network information, thus determining the data handling as described above.

Figure 15:
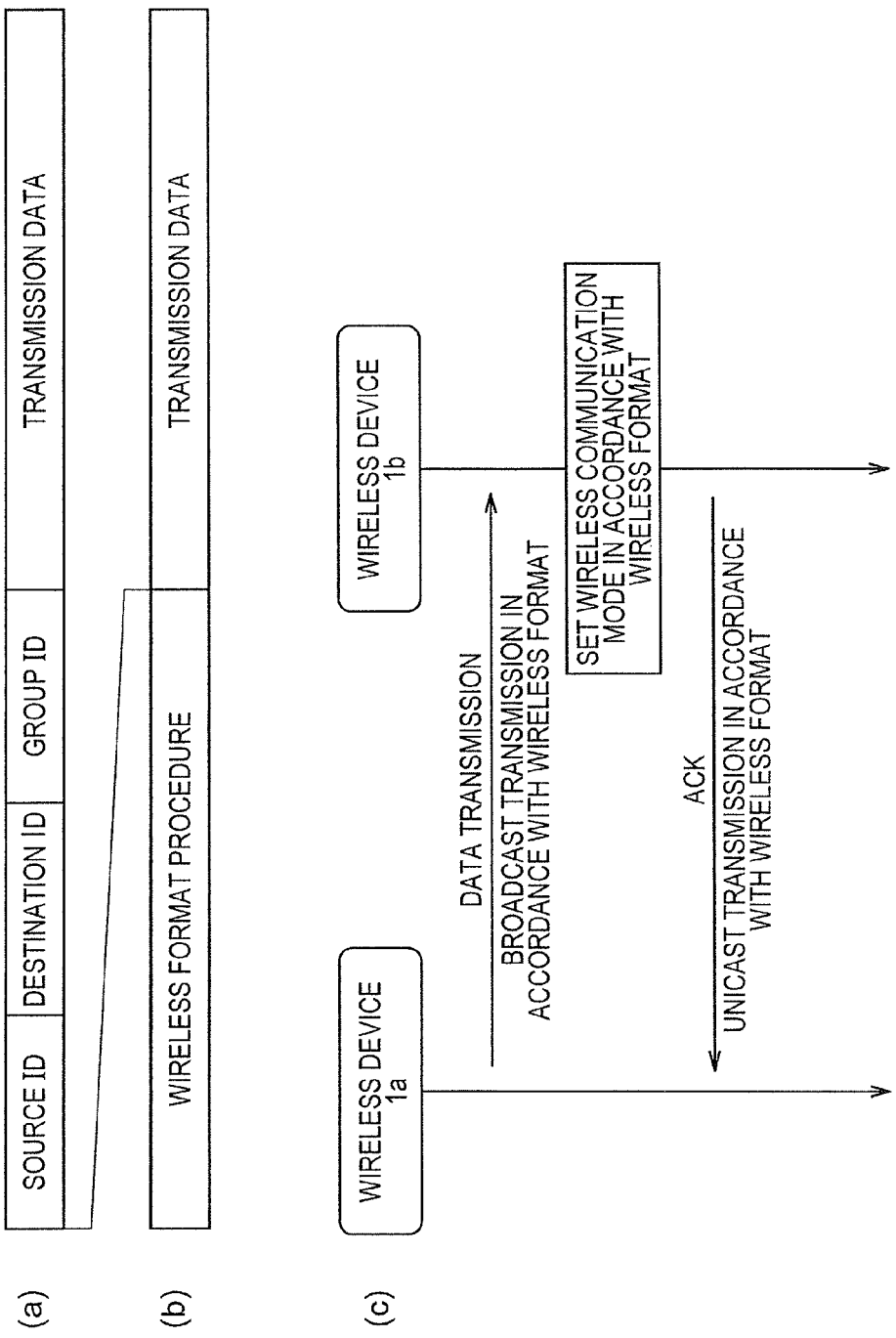
FIG. 15 is an explanatory view showing a wireless communication mode with standardized wireless format.

FIG. 15 is an explanatory view showing the method of carrying out the wireless communication using the wireless communication mode having the wireless format standardized. FIG. 15(a) shows the packet data of standardized wireless communication mode. If the wireless format is determined, the head of the data includes already set transfer procedure and the packet format as FIG. 15(b) shows. Accordingly, the standard format is directly used to store the packet of the transmission data shown in FIG. 15(a) in the data part. Communication between the wireless modules may be carried out with no problem as they employ the common wireless format. The transmission data stored in the data part are obtained, based on which the determination is made with respect to data handling. The corresponding wireless format is employed between the wireless modules. However, the data of only the ID numbers of the wireless devices are handled on the base substrate because of extracted data. As a result, the wireless device is allowed to carry out transmission and reception of the wireless communication using the ID number only without being limited to the wireless format. This makes it possible to carry out the communication without considering the wireless format. The wireless format includes such format as the wireless LAN, Bluetooth and ZigBee.

FIG. 16 is an explanatory view representing selection and change of the wireless module in the wireless device, and the program executed for selecting the wireless module in the wireless device. As the feature of the wireless communication with respect to the frequency shows, increase in the frequency for use via radio waves tends to increase the communication speed and reduce the communication distance. Decrease in the frequency tends to decrease the communication speed and to increase the communication distance. The device controller obtains the wireless frequency information from the wireless module mounted on the base substrate, and selects the wireless module at high frequency and high speed. If it is judged that the communication quality is deteriorated in the communication in the frequency band of the wireless module, the wireless module is changed to the one at the lower frequency. The aforementioned tryout is repeatedly carried out to select the wireless module optimal for the set-up status of the facility to be measured.

As described above, the wireless device contains the base substrate and the wireless modules each corresponding to the frequency and wireless format. The wireless module is formed of the wireless modem corresponding to the format and the control unit. The communication mode (command) transmitted to the control unit will be unified. The control unit interprets the unified command, and converts the command into the communication mode adapted to the mounted wireless modem for the wireless communication. The wireless modules at different frequencies and wireless formats share the control unit and the communication mode on the base substrate. Accordingly, the base substrate allows the communication even if the different wireless module is mounted thereon. The identification ID of the wireless device is independent from the communication mode with the specific wireless format such as MAC address (used in LAN) in the method of setting the number only, which allows the common use through different communication modes.

The wireless network information is set on the base substrate in the wireless device so as to allow use of the wireless format adapted to the environment. Setting all the wireless network information in all the wireless devices that constitute the network for common use ensures easy operation and maintenance of the network by confirming the wireless devices with one another.

REFERENCE SIGNS LIST 1 (1a-1h)
5 wireless device
2 base substrate
3 (3a-3d) wireless module
4 signal line
21 device controller
21a interface
21b control unit
21c memory
22-23 communication interface
25 terminal block
31 wireless modem
32 module control unit
33 connector

The invention claimed is:

1. A wireless device including a plurality of wireless modules on a base substrate, which carries out a wireless communication using a wireless module, of the plurality of wireless modules, adapted to a communication status, the plurality of wireless modules being detachably mounted on the base substrate and including a wireless modem for a wireless communication and a module control unit for controlling the wireless modules, and at least one of frequencies and communication modes of which having different values, the wireless device comprising:
 a device controller connected to the plurality of wireless modules via a signal line for selecting the wireless module adapted to the communication status; and
 a terminal block and a communication interface which are connected to the device controller for external connection,
 wherein the device controller transmits data obtained from the terminal block or the communication interface to the module control unit using a common communication command without considering a type of wireless frequency and a type of wireless communication mode of each of the wireless modules, the wireless module selected by the device controller is used for carrying out the wireless communication by the module control unit converting the common communication command into the communication command adapted to the wireless modem.

2. The wireless device according to claim 1, wherein the device controller selects the wireless module adapted to the communication status, and further includes a control unit for controlling an operation of the selected wireless module.

3. The wireless device according to claim 1,
 wherein the wireless device carries out a wireless communication with an other wireless device that has same frequencies and communication modes available as the wireless device, and the other wireless device carries out a wireless communication by the frequencies and communication modes selected by the device controller.

4. The wireless device according to claim 1, wherein the device controller includes a memory for setting network information of a wireless network system including a plurality of the wireless devices.

5. The wireless device according to claim 4, wherein the device controller sets the network information including an ID number for identifying the wireless device, an ID number of the wireless device as a counterpart of transmission and reception, and selection information of the wireless module to be used in the memory, and carries out the wireless communication with the wireless device as a destination of the transmission and reception using the selected wireless module.

6. The wireless device according to claim 3,
 wherein the device controller controls to change the frequency or communication mode depending on a wireless communication state, for carrying out a wireless communication with the other wireless device.

7. A wireless network system provided with a plurality of wireless modules on a base substrate, which is configured to have a plurality of wireless devices for carrying out a wireless communication using a wireless module, of the plurality of wireless modules, adapted to a communication status,
 wherein the plurality of wireless modules in a wireless device, of the plurality of wireless devices, are detachably mounted on the base substrate, having frequencies and/or communication modes, at least one of which has different values, and including a wireless modem for a wireless communication and a module control unit for controlling the wireless modules;
 the wireless device includes a device controller connected to the plurality of wireless modules via a signal line for selecting and operating the wireless module adapted to the communication status, and a terminal block and a communication interface which are connected to the device controller for external connection,
 the device controller transmits data obtained from the terminal block or the communication interface to the module control unit using a common communication command without considering a type of wireless frequency and a type of wireless communication mode of each of the wireless modules, and
 the wireless module selected by the device controller is used for carrying out the wireless communication by the module control unit converting the common communication command into the communication command adapted to the wireless modem.

8. The wireless network system according to claim 7, wherein the device controller of the wireless device includes a control unit for selecting the wireless module adapted to the communication status and controlling an operation of the selected wireless module.

9. The wireless network system according to claim 7,
 wherein the wireless device carries out a wireless communication with an other wireless device that has same frequencies and communication modes available as the wireless device, and the other wireless device carries out a wireless communication by the frequencies and communication modes selected by the device controller.

10. The wireless network system according to claim 7, wherein the device controller of the wireless device includes a memory for setting network information.

11. The wireless network system according to claim 10, wherein the device controller of the wireless device sets the network information including an ID number for identifying the wireless device, an ID number of the wireless device as a counterpart of transmission and reception, and selection information of the wireless module to be used in the memory, and carries out the wireless communication with the wireless device as a destination of the transmission and reception using the selected wireless module.

12. The wireless network system according to claim 7, wherein the device controller controls to change the frequency or communication mode depending on a wireless communication state, for carrying out a wireless communication with the other wireless device.

* * * * *